United States Patent
Kwon et al.

(10) Patent No.: US 9,768,913 B1
(45) Date of Patent: Sep. 19, 2017

(54) SYSTEM AND METHOD FOR MULTIPLE INPUT MULTIPLE OUTPUT (MIMO) DETECTION WITH SOFT SLICER

(71) Applicant: Samsung Electronics Co., Ltd., Gyeonggi-do (KR)

(72) Inventors: Hyukjoon Kwon, San Diego, CA (US); Linbo Li, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/141,115

(22) Filed: Apr. 28, 2016

Related U.S. Application Data (60) Provisional application No. 62/305,785, filed on Mar. 9, 2016.

(51) Int. Cl.
| | |
|---|---|
| *H04L 1/02* | (2006.01) |
| *H04L 1/00* | (2006.01) |
| *H04J 11/00* | (2006.01) |
| *H04B 7/0413* | (2017.01) |
| *H04L 25/03* | (2006.01) |

(52) U.S. Cl.
CPC ......... *H04L 1/0048* (2013.01); *H04B 7/0413* (2013.01); *H04J 11/0056* (2013.01); *H04L 25/03318* (2013.01); *H04L 2025/03426* (2013.01)

(58) Field of Classification Search
CPC ..... H04L 1/0618; H04L 1/06; H04L 27/2647; H04B 1/1027
USPC ........ 375/267, 340, 341, 346, 347; 714/748, 714/751
See application file for complete search history.

(56) References Cited

U.S. PATENT DOCUMENTS

| | | | |
|---|---|---|---|
| 2004/0013190 A1 | 1/2004 | Jayaraman et al. | |
| 2006/0256849 A1* | 11/2006 | Tseng | H04L 25/0307 375/232 |
| 2009/0103669 A1 | 4/2009 | Kolze et al. | |
| 2009/0285276 A1 | 11/2009 | Heikkila | |
| 2013/0251075 A1* | 9/2013 | Kim | H04L 27/3818 375/341 |
| 2015/0071389 A1 | 3/2015 | Eliaz | |
| 2016/0105303 A1* | 4/2016 | Kudtarkar | H04L 25/067 375/340 |
| 2016/0366003 A1* | 12/2016 | Kwon | H04L 27/3405 |

\* cited by examiner

*Primary Examiner* — Khai Tran
(74) *Attorney, Agent, or Firm* — The Farrell Law Firm, P.C.

(57) ABSTRACT

A system, method and device for wireless communication is provided. The method includes receiving, by a receiver, data from a transmitter, storing the data in the receiver, and determining, by the receiver, a probability of a bit stored in the data and a probability of a symbol based on the probability of the bit, wherein determining the probability of the bit includes moving a decision boundary associated with a constellation diagram.

20 Claims, 10 Drawing Sheets

Algorithm 2 Soft Symbol Calculation Based on Soft Bits

1: $P_t := 0, S_s := 0$
2: for m = 1 to $M$ do
3:    $b_h := g(c(m))$, hard bits for a QAM symbol
4:    $b_s :=$ a vector of soft bits from a soft slicer
5:    if $s_h$ is an adjacent symbol of $b_h$ then
6:      $P_s := 1$
7:      for b = 1 to $\log_2(M)$ do
8:        if $b_h(b) == 0$ then
9:          $P_b = 1 - b_s(b)$
10:       else
11:          $P_b = b_s(b)$
12:       end if
13:       $P_s = P_s \times P_b$
14:      end for
15:      $P_t = P_t + P_s$
16:      $S_s = S_s + P_s \times c(m)$
17:    end if
18: end for
Ensure: $P_t == 1$
19: return $S_s$

FIG. 10

SYSTEM AND METHOD FOR MULTIPLE INPUT MULTIPLE OUTPUT (MIMO) DETECTION WITH SOFT SLICER

PRIORITY

This application claims priority under 35 U.S.C. §119(e) to U.S. Provisional Patent Application No. 62/305,785 which was filed in the U.S. Patent and Trademark Office on Mar. 9, 2016, the content of which is incorporated herein by reference.

FIELD

The present disclosure generally relates to a method and apparatus for wireless communication, and more particularly, to a method and apparatus for multiple input multiple output (MIMO) detection with a soft slicer.

BACKGROUND

Users of electronic devices require increasing functionality in the applications and services provided by the electronic devices and communication networks used to connect those devices. Increasing the bandwidth and reliability of such communication networks is of increasing importance for user satisfaction. One of the challenges faced by wireless communication receivers in electronic devices is extracting the transmitted data from received wireless signals with reduced errors. A technique used by receivers to reduce transmission errors and correctly recover the transmitted bits of data is based on proper detection of symbols from a constellation of symbols in a system using quadrature amplitude modulation (QAM). Receiver detection of transmitted symbols is particularly challenging when performed in the presence of inter-stream interference caused by the use of multiple spatial streams being transmitted to the receiver.

SUMMARY

According to an aspect of the present disclosure, in a multiple input, multiple output (MIMO) wireless communication system, the detection of symbols representing transmitted bits of data may be recovered more efficiently and correctly using a soft slicer when demodulating the symbols.

According to an aspect of the present disclosure, a method is provided. The method including receiving, by a receiver, data from a transmitter, storing the data in the receiver, and determining, by the receiver, a probability of a bit stored in the data and a probability of a symbol based on the probability of the bit, wherein determining the probability of the bit includes moving a decision boundary associated with a constellation diagram.

According to an aspect of the present disclosure, an electronic device is provided. The electronic device including a transceiver that receives data from a transmitter, a storage that stores the received data, and a processor configured to determine a probability of a bit stored in the received data and a probability of a symbol based on the probability of the bit, wherein the probability of the bit is determined by moving a decision boundary associated with a constellation diagram.

According to an aspect of the present disclosure, a chipset for controlling a user equipment (UE) in a mobile communication system is provided The chipset configured to receive data transmitted by a wireless transmitter, store the data, determine a probability of a bit stored in the received data and a probability of a symbol based on the probability of the bit, wherein the probability of the bit is determined by moving a decision boundary associated with a constellation diagram.

BRIEF DESCRIPTION OF THE DRAWINGS

The above and other aspects, features and advantages of the present disclosure will become more apparent from the following detailed description, when taken in conjunction with the accompanying drawings, in which.

DETAILED DESCRIPTION

The present disclosure will now be described more fully hereinafter with reference to the accompanying drawings, in which embodiments of the present disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. In the drawings, the size and relative sizes of layers and regions may be exaggerated for clarity. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to, any and all combinations of one or more of the associated listed items.

It will be understood that, although the terms first, second, and other terms may be used herein to describe various elements, these elements should not be limited by these terms. These terms are only used to distinguish one element from another. For example, a first signal may be referred to as a second signal, and, similarly, a second signal may be referred to as a first signal without departing from the teachings of the disclosure.

The terminology used herein is for the purpose of describing particular embodiments only and is not intended to be limiting of the present device and method. As used herein, the singular forms "a", "an" and "the" are intended to include the plural forms as well, unless the context clearly indicates otherwise. It will be further understood that the terms "comprises" and/or "comprising," or "includes, but is not limited to" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meanings as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

Figure 1:
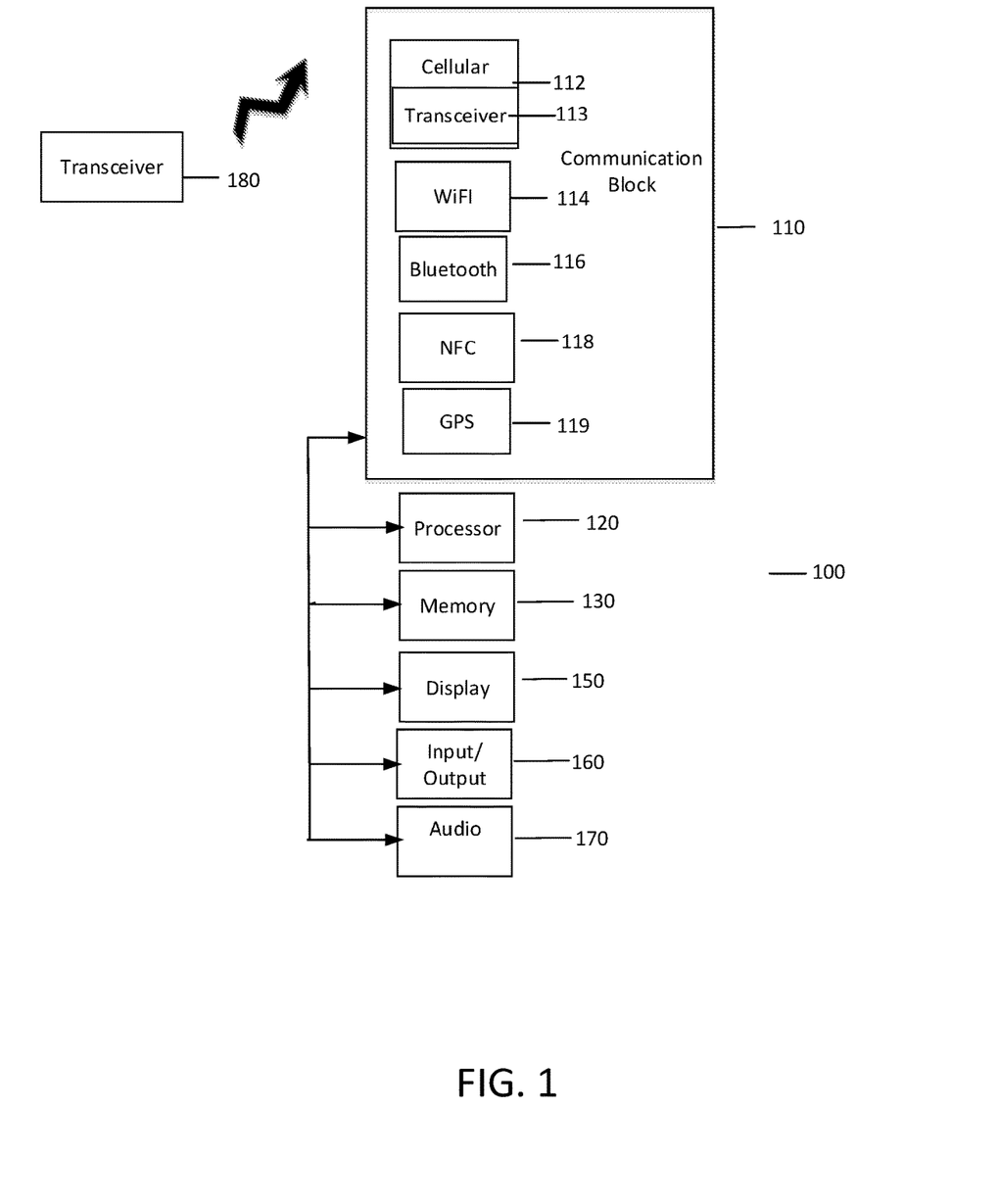
FIG. 1 is a schematic block diagram of an electronic device in a network environment, according to an embodiment of the present disclosure.

FIG. 1 is a schematic block diagram of an electronic device in a network environment, according to an embodiment of the present disclosure.

In FIG. 1, an electronic device 100 in a network environment, according to an embodiment of the present disclosure includes, but is not limited to, a communication block 110, a processor 120, a memory 130, a display 150, an input/output block 160, an audio block 170 and a transceiver 180.

The electronic device 100 includes, but is not limited to, a communication block 110 for connecting the device 100 to another electronic device or a network for communication of voice and data. The communication block 110 provides wide area, local area, personal area, near field, device to device (D2D), machine to machine (M2M) and short range communications. The functions of the communication block 110, or a portion thereof, may be implemented by a chipset. In particular, the cellular communications block 112 provides a wide area network connection through terrestrial base transceiver stations or directly to other electronic devices, using technologies such as D2D, M2M, long term evolution (LTE), 5$^{th}$ generation (5G), long term evolution advanced (LTE-A), code division multiple access (CDMA), wideband code division multiple access (WCDMA), universal mobile telecommunications system (UMTS), wireless broadband (WiBro), and global system for mobile communication (GSM). The cellular communications block 112 includes, but is not limited to, a chipset, a transceiver 113 which may include a processor, a transmitter, a receiver, a low noise amplifier, a demodulator, a detector, a descrambler, a deinterleaver, a soft slicer, and an interference canceller. The wireless fidelity (WiFi) communications block 114 provides a local area network connection through network access points using technologies such as IEEE 802.11. The Bluetooth communications block 116 provides personal area direct and networked communications using technologies such as IEEE 802.15. The near field communications (NFC) block 118 provides point to point short range communications using standards such as ISO/IEC 14443. The communication block 110 also includes, but is not limited to, a GPS satellite signal receiver 119. The GPS receiver 119 provides for receiving Global Positioning System signals in order to compute the device's absolute position, velocity, acceleration and time. The electronic device 100 may receive electrical power for operating the functional blocks from a power supply, including a battery. The transceiver 180 may include a base transceiver station (BTS) or a user equipment (UE). The transceiver 180 may also include a transmitter and a receiver.

The processor 120 provides application layer processing functions required by the user of the electronic device 100. The processor 120 also provides command and control functionality for the various blocks in the electronic device 100. The processor 120 provides for updating control functions required by the functional blocks. The processor 120 may provide for coordination of resources required by the transceiver 113 including communication control between the functional blocks. The processor 120 may also update the firmware, databases and libraries associated with the transceiver 113. The cellular communications block 112 may also have a local processor or a chipset which dedicates computing resources to the transceiver 113 and other functional blocks required for cellular communication.

The memory 130 provides storage for device control program code, user data storage, application code and data storage. The memory 130 may provide data storage for the firmware, libraries, databases, look up tables and calibration data required by the transceiver 113. The databases may include look up tables, and the like. The program code and databases required by the transceiver 113 may be loaded into local storage within the transceiver 113 from the memory 130 upon device boot up. The transceiver 113 may also have local non-volatile memory for storing the program code, libraries, databases and look up table data.

The display 150 may be a touch panel, and may be embodied as an LCD, LED, OLED, AMOLED, and the like. The input/output block 160 controls the interface to the user of the electronic device 100. The audio block 170 provides for audio input and output to/from the electronic device 100.

In wireless data communication systems such as LTE, LTE-A and 5G, multiple input, multiple output (MIMO) is a method of increasing bandwidth by using multiple transmit channels and multiple receive channels. Transceiver 113 may recover the data from each of the MIMO receive channels in the presence of interference introduced from the other channels or from other cells in the network.

One of the blocks used for demodulation of received signals during the recovery of the data in the transceiver 113 is a slicer. The use of a slicer in the interference cancellation process reduces the complexity of received signal detection. For example, a transceiver 113 in an electronic device 100 requires suppressing inter-stream or inter-cell interference effectively in order to maximize the recovery of the received data. A maximum likelihood (ML) or joint detection (JD) method is typically used in interference cancellation. However, as the number of spatial streams increases linearly, the complexity of the ML method or JD method increases exponentially resulting in a more complex transceiver 113 design. Symbol-level interference cancellation (SLIC) and/or successive interference cancellation (SIC) methods may reduce transceiver 113 design complexity as well as improve the bandwidth performance of the electronic device 100. A slicer may be used in conjunction with SLIC and SIC interference cancellation methods. When the input symbol is provided to the slicer, the slicer produces two types of output results: a symbol from the constellation diagram that is nearest to the input symbol (as measured by the Euclidian distance (ED)), and a set of bits corresponding to the symbol. When the modulation order of QAM is N, the number of bits per symbol is log (N). The set of bits corresponds to log (N) bits for the selected QAM symbol. The output results from the slicer are hard values, i.e., a symbol is one of pre-determined quadrature amplitude modulation (QAM) constellation points and a set of bits is a combination of 0 or 1.

According to an embodiment of the present disclosure, a soft slicer improves the symbol detection capability in a transceiver 113, by enhancing a slicer to generate a soft symbol without a priori information. The a priori information may include a set of log-likelihood ratios corresponding to each of the bits. The soft slicer may use minimum mean-squared error with successive interference cancellation (MMSE-SIC) techniques for symbol detection. According to an embodiment of the present disclosure, the soft slicer may receive a priori information as input and initialize the probabilities with the a priori information.

A soft slicer operation may be classified into two categories, the first category is with the soft slicer receiving a priori information and the second category is without the soft slicer receiving a priori information. The performance of the operation of the soft slicer may be enhanced with the soft slicer receiving a priori information. When an iterative operation is implemented such as iterative detection and decoding (IDD), a soft slicer receives a priori information from the second iteration or the second code word. By changing the decision boundary of the symbol based on a priori information, a soft slicer may produce more accurate hard symbols. A slicer that has been designed with hard decision boundaries means that the bit is quantized to 0 or 1 after its real or imaginary part is compared with a threshold. Even with a priori information, the symbol detection operation itself is not changed. Instead, the threshold value is adjusted using the a priori information. As a result, a slicer output is in the form of hard symbols or one of the constellation points on the constellation diagram.

Figure 2:
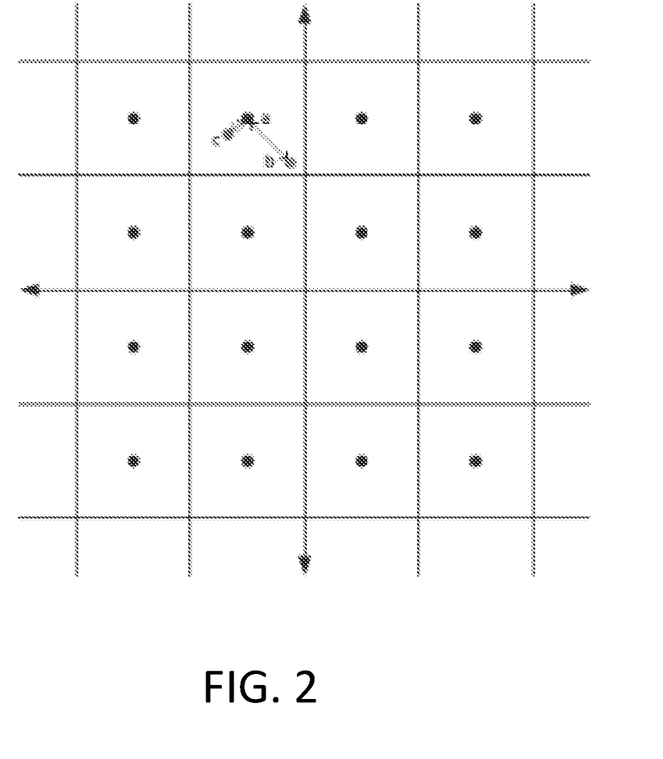
FIG. 2 illustrates a constellation diagram of 16 QAM, according to an embodiment of the present disclosure.

FIG. 2 illustrates a constellation diagram of 16 QAM, according to an embodiment of the present disclosure.

Referring to FIG. 2, the constellation diagram includes 16 constellation points. In 16 QAM, the constellation points are arranged in a square grid with equal vertical and horizontal spacing. Although 16 QAM is used in describing the present disclosure, it is not limited to such. Each point on the constellation diagram represents one of 16 possible combinations of binary numbers encoded into a symbol received by the transceiver 113. A typical slicer selects the nearest (having the smallest ED) symbol to the input symbol received by the transceiver 113 on the constellation diagram. For example, both input points b and c are sliced to constellation point a, regardless of the distance from input points b and c to constellation point a. Given a priori information, the decision boundary itself moves. Without a priori information, the decision boundary does not move.

According to an embodiment of the present disclosure, the soft slicer adaptively adjusts a decision boundary that results in an adjustment of bit probabilities, and accordingly, symbol probabilities. The output of the soft slicer becomes a soft symbol such that it improves the detection of symbols in a MIMO system in the presence of interference. The present system and method provides modified slicing behavior around constellation diagram decision boundaries such that each bit of the symbol is determined with a probability. The soft slicer output is a soft symbol that is calculated with symbol probabilities. The soft symbol is averaged with neighboring symbols, each with their own probabilities generated by the soft slicer. The present system and method may also be applied to SIC for MIMO detection.

According to an embodiment of the present disclosure, the soft slicer changes the slicer output corresponding to modified decision boundaries in the constellation diagram. The decision boundary may be linear or non-linear. The soft slicer modifies slicing behavior around constellation diagram decision boundaries to quantify and measure the reliability of each bit of an input symbol. A soft sliced bit is produced instead of a hard sliced bit (i.e., 0 or 1). A soft bit may be generated even without a priori information.

Furthermore, a soft sliced symbol is generated instead of a hard sliced symbol. A soft symbol may also be generated without a priori information. One or more decision boundaries are adaptively adjusted (moved) based on various factors including the modulation and coding scheme (MCS) used in the transmission of the data and channel profiles. The present system and method may operate with or without a priori information.

Figure 3:
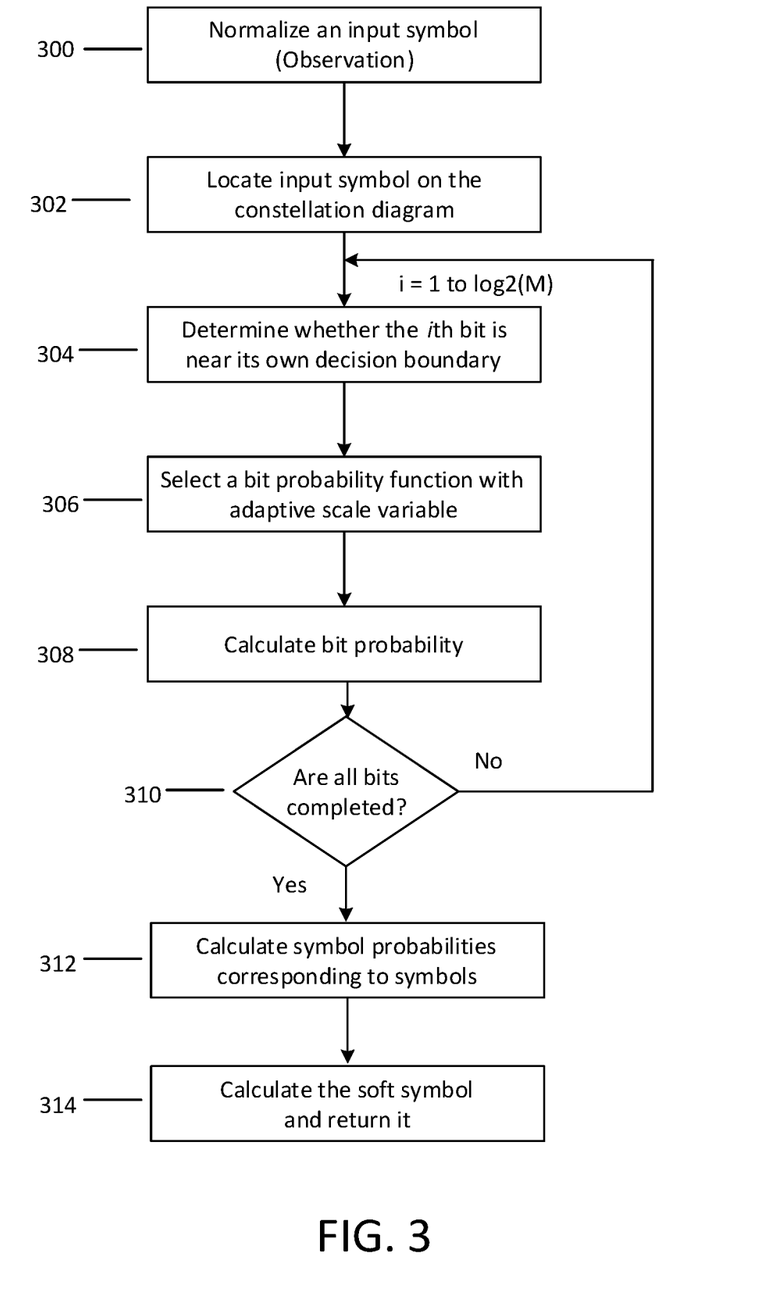
FIG. 3 is a flowchart illustrating an operation of a soft slicing process, according to an embodiment of the present disclosure.

FIG. 3 is a flowchart illustrating an operation of a soft slicing process, according to an embodiment of the present disclosure.

Referring to FIG. 3, at 300, an input symbol received by the transceiver 113 is normalized (observation) in preparation for locating the input symbol on the constellation diagram. At 302, the input symbol is located on the constellation diagram. At 304, the soft slicer determines whether the $i^{th}$ bit of the input symbol is located near its own decision boundary. At 306, the soft slicer selects a function for determining bit probability of the input symbol with an adaptive scale variable. The soft slicer may adapt the function for determining bit probability as a function of communication parameters including modulation and coding scheme or channel profiles. At 308, the soft slicer calculates the probability of the bit to be 1 or 0. At 310, the soft slicer determines if calculating the probability of all bits in the input symbol is completed. The number of bits to be calculated for each input symbol of a constellation diagram of M points is log 2 (M). If the number of bits calculated is less than log 2 (M), the soft slicer operation returns to 304 to calculate the probability of the next bit (i+1). If the number of bits calculated is equal to log 2 (M), the soft slicer operation proceeds to 312 to calculate the symbol probabilities corresponding to the input symbols. At 314, the soft symbol is calculated and returned to the transceiver 113.

Figure 4:
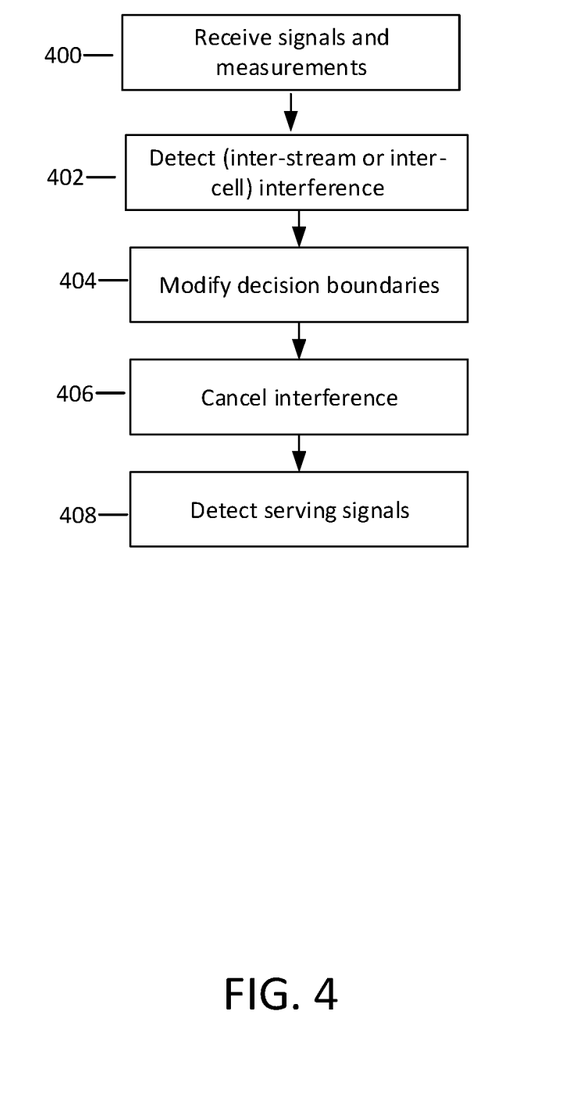
FIG. 4 is a block diagram of a symbol detector using successive interference cancellation, according to an embodiment of the present disclosure.

FIG. 4 is a block diagram of a symbol detector using successive interference cancellation (SIC), according to an embodiment of the present disclosure.

The present system and method includes SIC with a soft slicer for detection of symbols in the presence of interference including inter-stream and inter-cell interference. A soft slicer receives an input symbol (observation) and generates an output symbol (one of M points on the constellation diagram) by cancelling the interference. The performance of the soft slicer may be enhanced based on a priori information. According to an embodiment of the present disclosure, the soft slicer generates a soft symbol based on modified decision boundaries. Referring to FIG. 4, at 400, the transceiver 113 receives input signals and measurements related to the input symbols. At 402, inter-stream interference (resulting from multiple spatial streams interfering with one another) or inter-cell interference (resulting from neighboring cell transmissions, typically at the cell edge) is detected. At 404, the soft slicer modifies the decision boundaries of the constellation diagram. At 406, the inter-stream or inter-cell interference is canceled. At 408, a detection of the serving signals is made (for example, in a 64QAM system, a symbol having a value between 0 and 63 is detected).

Figure 5:
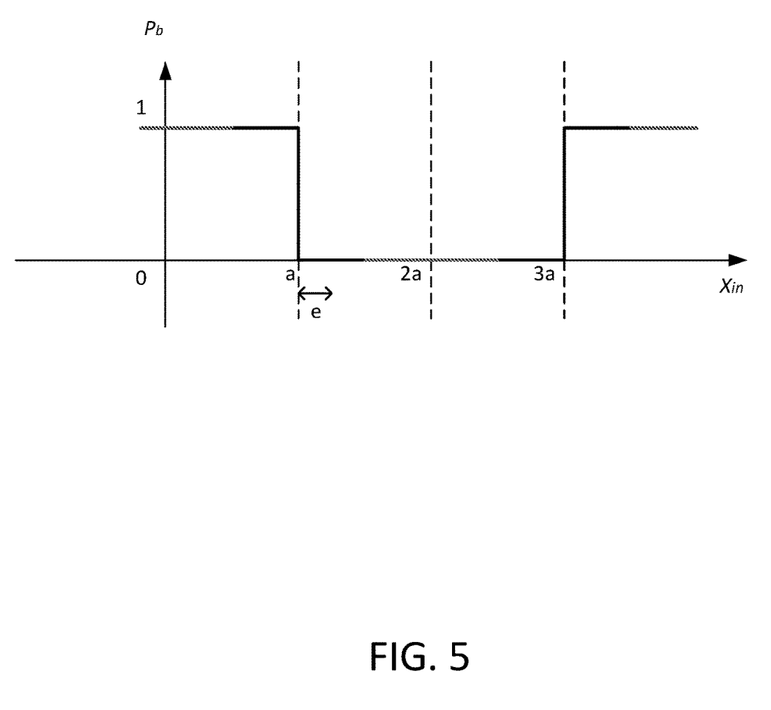
FIG. 5 is a diagram illustrating a decision boundary for a hard symbol, according to another embodiment of the present disclosure.

FIG. 5 is a diagram illustrating a decision boundary for a hard symbol, according to another embodiment of the present disclosure.

Referring to FIG. 5, the decision boundary corresponds to the 5th bit in 64 QAM (M=6). In FIG. 5, the vertical axis, $P_b$, corresponds to the probability of the $5^{th}$ bit which varies between 0 and 1. The horizontal axis, $X_{in}$, corresponds to an input symbol to the soft slicer. Other cases in which M is not equal to 6 may be also be derived with similar boundaries to the constellation diagram of FIG. 2. The slicing bit is determined to be 1 if the input is less than a, or larger than 3a, where "a" refers to the minimum distance between two constellation pints in the QAM map. In other words, the slicing bit is declared to be 1 with probability $P_b(b=1)=1$ or $P_b(b=1)=0$ under the decision boundary in FIG. 5.

The slicer modifies the decision boundary based on the following rationale: the farther an input symbol is from a decision boundary, the more reliable the input symbol.

According to an embodiment of the present disclosure, the decision boundary may be simplified to be linear or non-linear. Given the decision boundary, the soft slicer measures and quantifies the reliability of each bit of an input symbol. The degree of reliability is quantified in a soft bit. For example, if the input symbol is located at the exact boundary, the corresponding bit probability is 0.5. In other words, there is an equal probability the symbol is either of the symbols on both sides of the boundary. If the input symbol is sufficiently far enough from the boundary (i.e., located at the exact constellation point), the soft bit becomes 1 indicating a probability of 1. Given soft bits (i.e., bit probabilities), the symbol probabilities associated with those soft bits may be calculated, and soft symbols may be determined accordingly.

Figure 6:
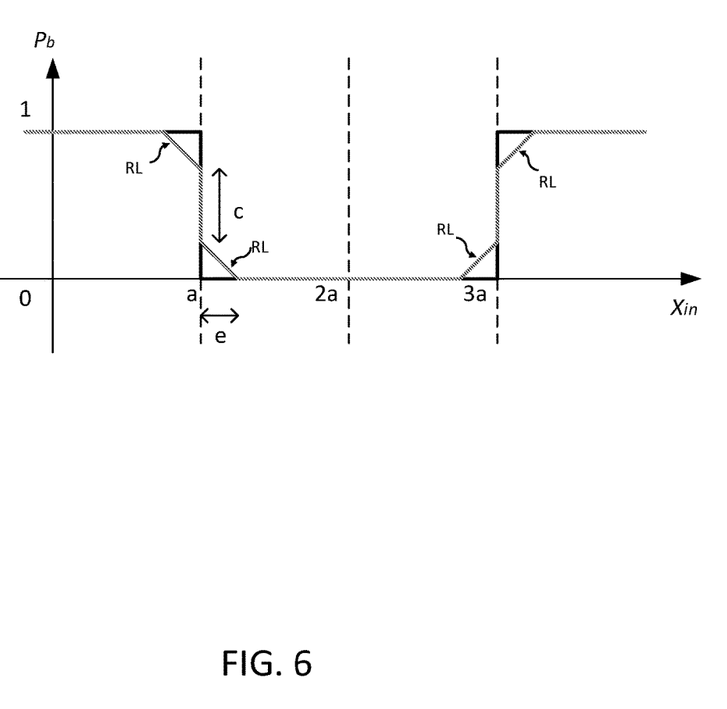
FIG. 6 is a diagram illustrating a decision boundary for the fifth bit of a 64 QAM symbol, according to an embodiment of the present disclosure.

FIG. 6 is a diagram illustrating a decision boundary for the fifth bit of a 64 QAM symbol, according to an embodiment of the present disclosure.

One of the decision boundaries is illustrated with the overlap of conventional boundaries in FIG. 6. FIG. 6 depicts a decision boundary where 64 QAM is modulated and the 5th bit of the symbol is being sliced. In FIG. 6, the vertical axis, $P_b$, corresponds to the probability of the $5^{th}$ bit which varies between 0 and 1. The horizontal axis, $X_{in}$, corresponds to the input symbol.

Referring to FIG. 6, the slicing bit is declared with $P_b(b=1)$ corresponding to the line RL. RL represents the modified boundary resulting from a first order piecewise linear mapping. The probability of $P_b(b=1)=1$ or $P_b(b=1)=0$, is determined to be either 1 or 0 if the input symbol is far from the decision axis, a or 3a. However, if the slicing bit is close to the boundary, i.e., within a±ϵ or 3a±ϵ, the probability varies between 1 and 0 ($0 < P_b(b=1) < 1$).

According to an embodiment of the present disclosure, the piecewise linear (PWL) soft slicer may be expressed with minimum and maximum functions as in Equation (1) below:

$$\{\min\left(\frac{(1-c)(|\Re(x_{in})|-3a)+(1+c)\epsilon}{2\epsilon}, 1\right) \text{ if } 3a < |\Re(x_{in})| \quad (1)$$

The bit probability may be calculated as in Equation (2) below:

$$b_5(x_{in}) = (a+|\Re(x_{in})|)u(|\Re(x_{in})|-3a). \quad (2)$$

The PWL soft slicer calculates unequal symbol probabilities without a priori information. The closer an input symbol is to a decision boundary, the less reliable the bit probability. The soft slicer output is quantified by converting bit probabilities to symbol probabilities.

Figure 7:
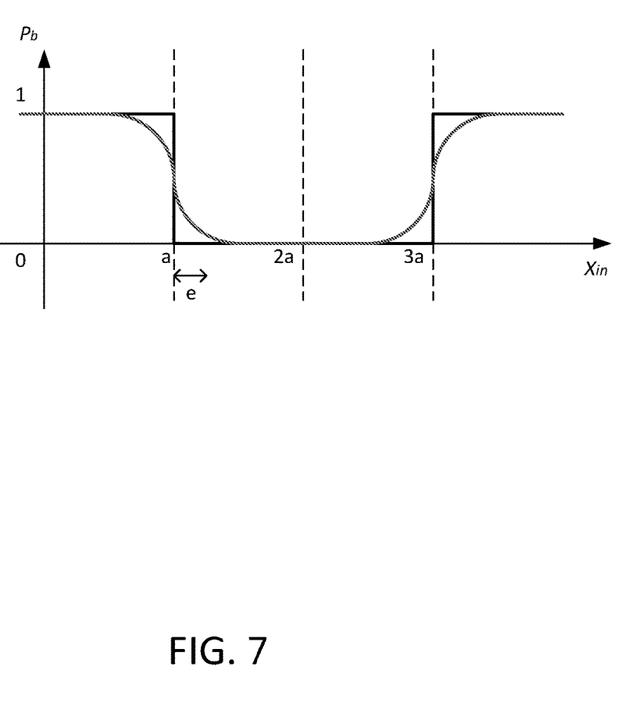
FIG. 7 is a diagram illustrating a decision boundary resulting from a soft slicer, according to an embodiment of the present disclosure.

FIG. 7 is a diagram illustrating a decision boundary resulting from a soft slicer, according to an embodiment of the present disclosure. In FIG. 7, the vertical axis, $P_b$, corresponds to the probability of the $5^{th}$ bit which varies between 0 and 1. The horizontal axis, $X_{in}$, corresponds to the input symbol. FIG. 7 represents a generalized form of a typical slicer. The decision boundary of the soft slicer may be linear, non-linear or a trigonometric function.

Depending on the value of c in FIG. 6, the modified boundary may look like a piece-wise linear shape (0<c<1.) or a simple 1st order linear shape (c=0), or a conventional hard boundary (c=1).

Figure 8:
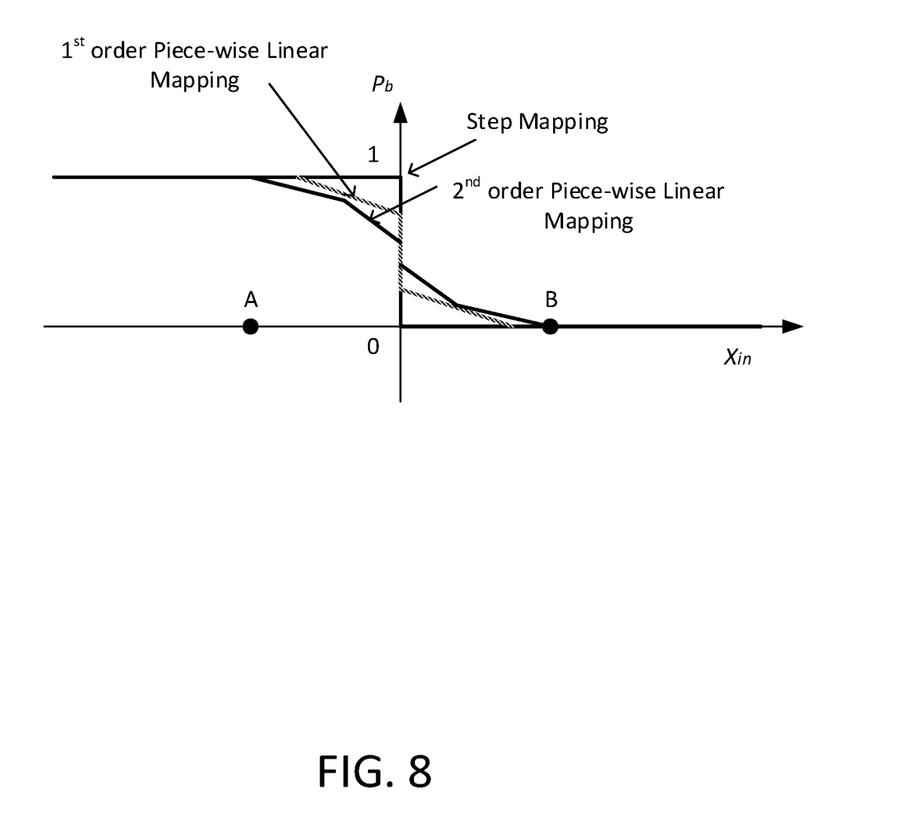
FIG. 8 is a diagram illustrating a decision boundary using piece-wise linear mapping, according to an embodiment of the present disclosure.

FIG. 8 is a diagram illustrating a decision boundary using a piece-wise linear mapping, according to an embodiment of the present disclosure. In FIG. 8, the vertical axis, $P_b$, corresponds to the probability of the $5^{th}$ bit which varies between 0 and 1. The horizontal axis, $X_{in}$, corresponds to the input symbol.

The boundary may be a non-linear function that includes a hyperbolic tangent and an exponential function. The boundary may further include nth order piece-wise linear mapping as illustrated in FIG. 8. According to an embodiment of the present disclosure, the system and method provides piece-wise linear (PWL) mapping that approximates the tail region of an arbitrary distribution of the input symbol Xin into a linear form.

Figure 9:
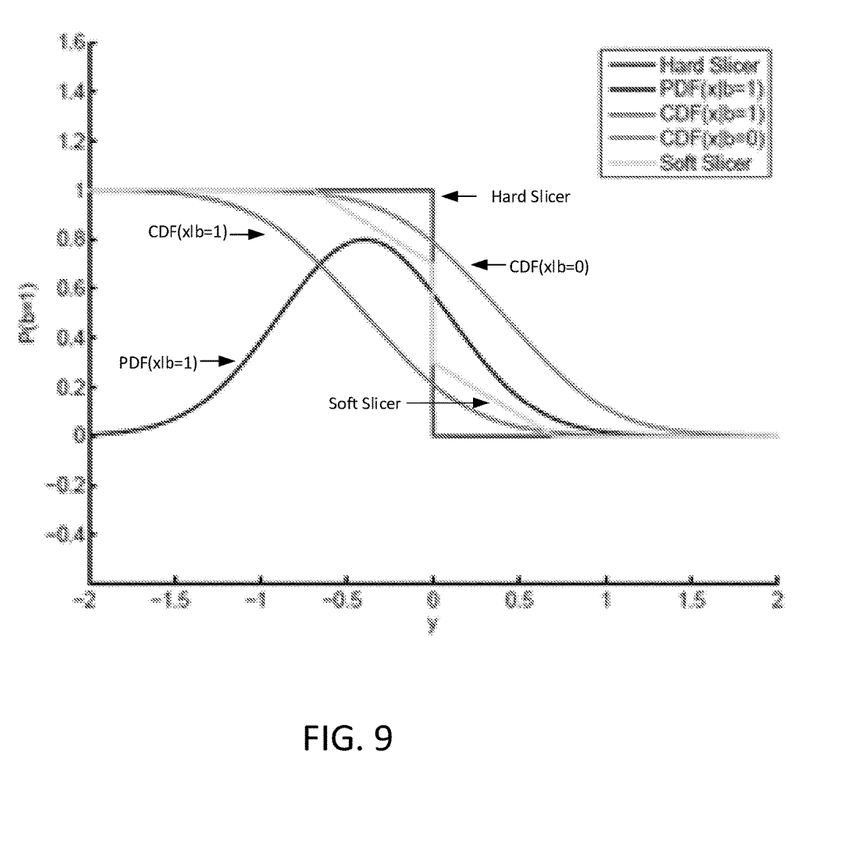
FIG. 9 is a diagram illustrating bit mapping for a soft slicer, according to an embodiment of the present disclosure.

FIG. 9 is a diagram illustrating bit mapping for a soft slicer, according to an embodiment of the present disclosure.

FIG. 9 illustrates the relative performance of the soft slicer a probability distribution function (PDF) as shown. In FIG. 9, the vertical axis, $P_b$, corresponds to the probability of the $5^{th}$ bit which varies between 0 and 1. The horizontal axis, y, corresponds to the input symbol to the soft slicer.

FIG. 9 illustrates a single decision boundary in which two transmit symbols of b=1 and b=0 are located across the boundary. These binary bits correspond to bipolar bits, −1 and +1. Regardless of the actual distribution of Xin, the tail region of its cumulative distribution function (CDF) allows P (b=1) to be non-negative even if Xin is greater than 0. In general, the tail region of Xin distribution is a non-linear function as shown in FIG. 9. The PWL mapping may be developed to the nth order linear form in order to increase approximation accuracy. However, as n increases, the number of required computing components (for example, comparators, multipliers, adders) and system complexity also increases. Therefore, the PWL mapping for the soft slicer resembles the slicing characteristics in an optimal demodulator at a high signal noise ratio (SNR).

Any type of boundary modification in addition to those described herein, may be applied without deviating from the scope of the present disclosure. According to an embodiment of the present disclosure, the boundary shape may be determined based on various factors including the modulation and coding scheme (MCS), channel profiles, and decoder performance. As decoder performance increases, an aggressive soft slicer may be applied with a small value of c. Therefore, the decision boundary of the soft slicer may be adaptively determined in practice.

Based on the modified decision boundary, the slicing bit may be declared with a probability $P_b(b=1)$ and $P_b(b=0)=1-P_b(b=1)$. Correspondingly, the slicing symbol may be declared with a probability $P_s(s=s_k)=\Pi P_b(b=b_k)$ (the product of individual bit probabilities), where $b_k$ is a bit for the candidate symbol $s_k$ on the constellation diagram.

Figure 10:
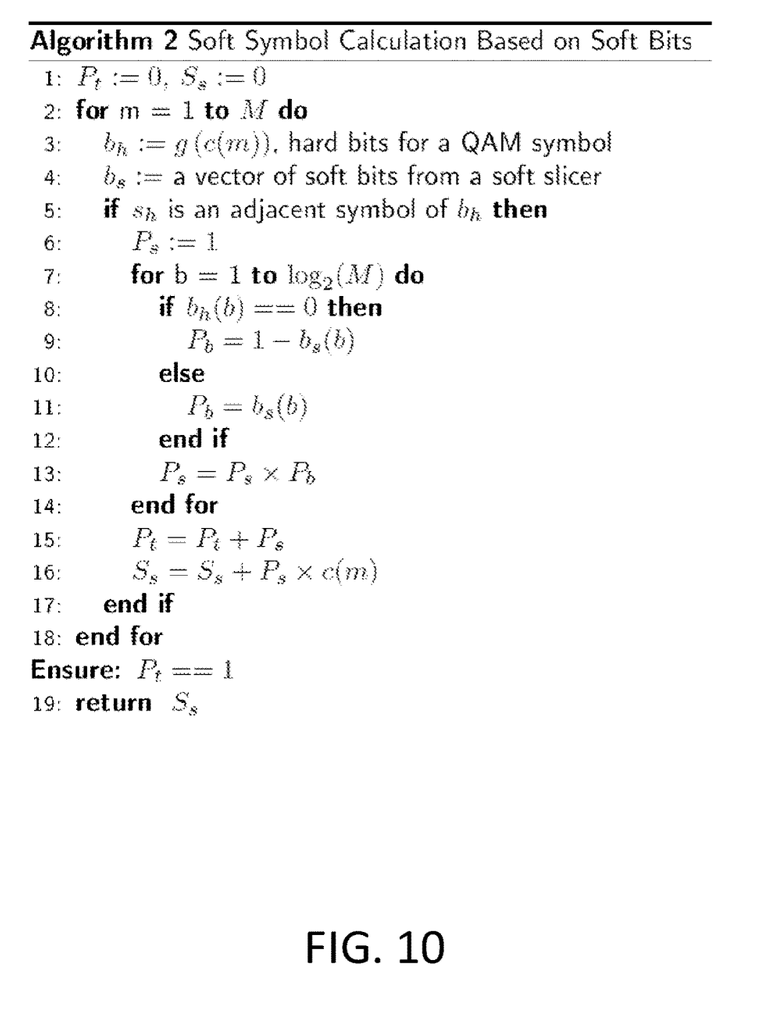
FIG. 10 illustrates an algorithm for soft symbol calculation based on soft bits, according to an embodiment of the present disclosure.

FIG. 10 illustrates an algorithm for soft symbol calculation based on soft bits, according to an embodiment of the present disclosure.

Referring to FIG. 10, the algorithm corresponds to the last 2 steps of the flow chart illustrated in FIG. 3. The algorithm may be applied after all soft bits are calculated.

In the algorithm of FIG. 10, $P_t$ represents the sum of symbol probabilities around the input symbol, $x_{in}$. Instead of performing a full search on the constellation diagram, the soft slicer considers neighbor symbols around $x_{in}$ for the purpose of computational complexity reduction. After calculating all of the slicing probabilities, the sum of the probabilities represented by $P_t$ should be 1. $S_s$ denotes the soft symbol that the soft slicer generates as its output. In addition, c( ) is a function to determine a QAM symbol on the constellation diagram. g( ) is a function to convert a symbol to a set of corresponding bits. The element of a vector, $b_s$, is the bit probability, $b_s(b)$, calculated with the modified decision boundary, i.e., the same as $P_b(b=1)$ above.

According to an embodiment of the present disclosure, the system and method includes a point-to-point channel where a base station (BS) and a user equipment (UE) are equipped with Nt and Nr antennas, respectively. The BS is implemented using a bit-interleaved coded modulation (BICM) scheme so that the sequence of binary data bits per code word is encoded. The coded bits, lengthened by the code rate, are scrambled and permuted by an interleaver. A large interleaving pattern would generate statistically independent bits in a code word. The coded sequence is grouped into N bits and mapped to M-ary quadrature amplitude modulation (QAM) symbols on the constellation diagram. Next, a group of Ns symbols form a transmit symbol vector that is precoded to generate a transmit signal vector. The signal vector is transmitted over multiple (Nt) antennas. Since the precoding matrix is combined with channel matrices, a UE only needs to estimate combined channel matrices. No precoding is equivalent to a linear precoding with an identity matrix. The received signal at a single resource element may be simplified to equation (3) below:

$$y = Hx + n \quad (3)$$

Where H is a combined channel matrix and x is a transmit vector with a power restriction of $E[xx^\dagger] = I_{Na}$. The element of a noise vector, n, follows an independent and identical distributed complex Gaussian distribution with zero mean and unit variance.

According to an embodiment of the present disclosure, the soft slicer calculates and assigns probabilities to each bit associated with an input symbol. The bit probability is 0.5 if the input symbol is located at the decision boundary. As the input symbol moves farther from the decision boundary, the bit probability approaches 1 or 0. Therefore, the bit probabilities associated with an input symbol may be transformed into a symbol probability such that the statistical output may be generated by the soft slicer. The soft slicer produces more reliable bits of a symbol while maintaining robustness in a non-Gaussian noise distribution environment.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method, comprising:
receiving, by a receiver, data from a transmitter;
storing the data in the receiver; and
determining, by the receiver, a probability of a bit stored in the data and a probability of a symbol based on the probability of the bit, wherein determining the probability of the bit comprises:
moving a decision boundary associated with a constellation diagram.

2. The method of claim 1, wherein moving the decision boundary associated with the constellation diagram comprises:
calculating the moved decision boundary using a piece wise linear soft slicer.

3. The method of claim 1, wherein moving the decision boundary associated with the constellation diagram comprises:
calculating the moved decision boundary using a first order piece wise linear soft slicer.

4. The method of claim 1, wherein the moved decision boundary is calculated without a-priori information.

5. The method of claim 1, wherein the moved decision boundary is calculated based upon at least one of a modulation and coding scheme, a channel profile, and a decoder performance.

6. The method of claim 1, wherein moving the decision boundary cancels at least one of inter-stream interference or inter-cell interference associated with the received data.

7. The method of claim 1, wherein the receiver executes a communications protocol associated with at least one of device to device (D2D), machine to machine (M2M), long term evolution (LTE), $5^{th}$ generation (5G), long term evolution advanced (LTE-A), code division multiple access (CDMA), wideband code division multiple access (WCDMA), universal mobile telecommunications system (UMTS), wireless broadband (WiBro), and global system for mobile communication (GSM), Wireless Fidelity (Wi-Fi), Bluetooth, and near field communication (NFC).

8. The method of claim 7, wherein the communications protocol utilizes multiple input, multiple output (MIMO) antennas.

9. An electronic device comprising:
a transceiver that receives data from a transmitter;
a storage that stores the received data; and
a processor configured to determine a probability of a bit stored in the received data and a probability of a symbol based on the probability of the bit, wherein the probability of the bit is determined by moving a decision boundary associated with a constellation diagram.

10. The electronic device of claim 9, wherein the processor is further configured to:
calculate the moved decision boundary using a piece wise linear soft slicer.

11. The electronic device of claim 9, wherein the processor is further configured to:
calculate the moved decision boundary using a first order piece wise linear soft slicer.

12. The electronic device of claim 9, wherein the processor is further configured to:
calculate the moved decision boundary without a-priori information.

13. The electronic device of claim 9, wherein the processor is further configured to:
calculate the moved decision boundary based upon at least one of a modulation and coding scheme, a channel profile, and a decoder performance.

14. The electronic device of claim 9, wherein moving the decision boundary cancels at least one of inter-stream interference or inter-cell interference associated with the received data.

15. The electronic device of claim 9, wherein the wireless communication device executes a communications protocol associated with at least one of device to device (D2D), machine to machine (M2M), long term evolution (LTE), $5^{th}$ generation (5G), long term evolution advanced (LTE-A), code division multiple access (CDMA), wideband code division multiple access (WCDMA), universal mobile telecommunications system (UMTS), wireless broadband (Wi-Bro), and global system for mobile communication (GSM), Wireless Fidelity (Wi-Fi), Bluetooth, and near field communication (NFC).

16. The electronic device of claim 10, wherein the communications protocol utilizes multiple input, multiple output (MIMO) antennas.

17. A chipset for controlling a user equipment (UE) in a mobile communication system, the chipset configured to:
  receive data transmitted by a wireless transmitter;
  store the data;
  determine a probability of a bit stored in the received data and a probability of a symbol based on the probability of the bit, wherein the probability of the bit is determined by moving a decision boundary associated with a constellation diagram.

18. The chipset of claim 17, wherein moving the decision boundary associated with the constellation diagram comprises:
  calculating the moved decision boundary using a first order piece wise linear soft slicer.

19. The chipset of claim 17, wherein moving the decision boundary associated with the constellation diagram comprises:
  calculating the moved decision boundary without a-priori information.

20. The chipset of claim 17, wherein the mobile communication system is at least one of device to device (D2D), machine to machine (M2M), long term evolution (LTE), $5^{th}$ generation (5G), long term evolution advanced (LTE-A), code division multiple access (CDMA), wideband code division multiple access (WCDMA), universal mobile telecommunications system (UMTS), wireless broadband (Wi-Bro), and global system for mobile communication (GSM), Wireless Fidelity (Wi-Fi), Bluetooth, and near field communication (NFC).

* * * * *